Nov. 2, 1926.

G. GLASS

PEA GRADER

Filed April 26, 1920    5 Sheets-Sheet 1

1,605,541

Inventor.
George Glass.
By: Jones, Addington, Ames & Seibold
Attys.

Nov. 2, 1926.  
G. GLASS  
1,605,541  
PEA GRADER  
Filed April 26, 1920  
5 Sheets-Sheet 2

Inventor  
George Glass.

Nov. 2, 1926.  
G. GLASS  
PEA GRADER  
Filed April 26, 1920

Inventor.  
George Glass.  
By Jones, Addington, Ames & Seibold Attys.

Patented Nov. 2, 1926.

1,605,541

UNITED STATES PATENT OFFICE.

GEORGE GLASS, OF MILWAUKEE, WISCONSIN, ASSIGNOR, BY MESNE ASSIGNMENTS, TO SPRAGUE-SELLS CORPORATION, OF HOOPESTON, ILLINOIS.

PEA GRADER.

Application filed April 26, 1920. Serial No. 376,623.

My invention relates to machines for separating a mass of material into a plurality of portions, each portion containing particles of substantially the same size, and it has particular relation to machines of the character designated which are adapted for the grading of peas or other small fruits or vegetables.

For a better understanding of my invention reference may be had to the accompanying drawings in which.

Figure 1:
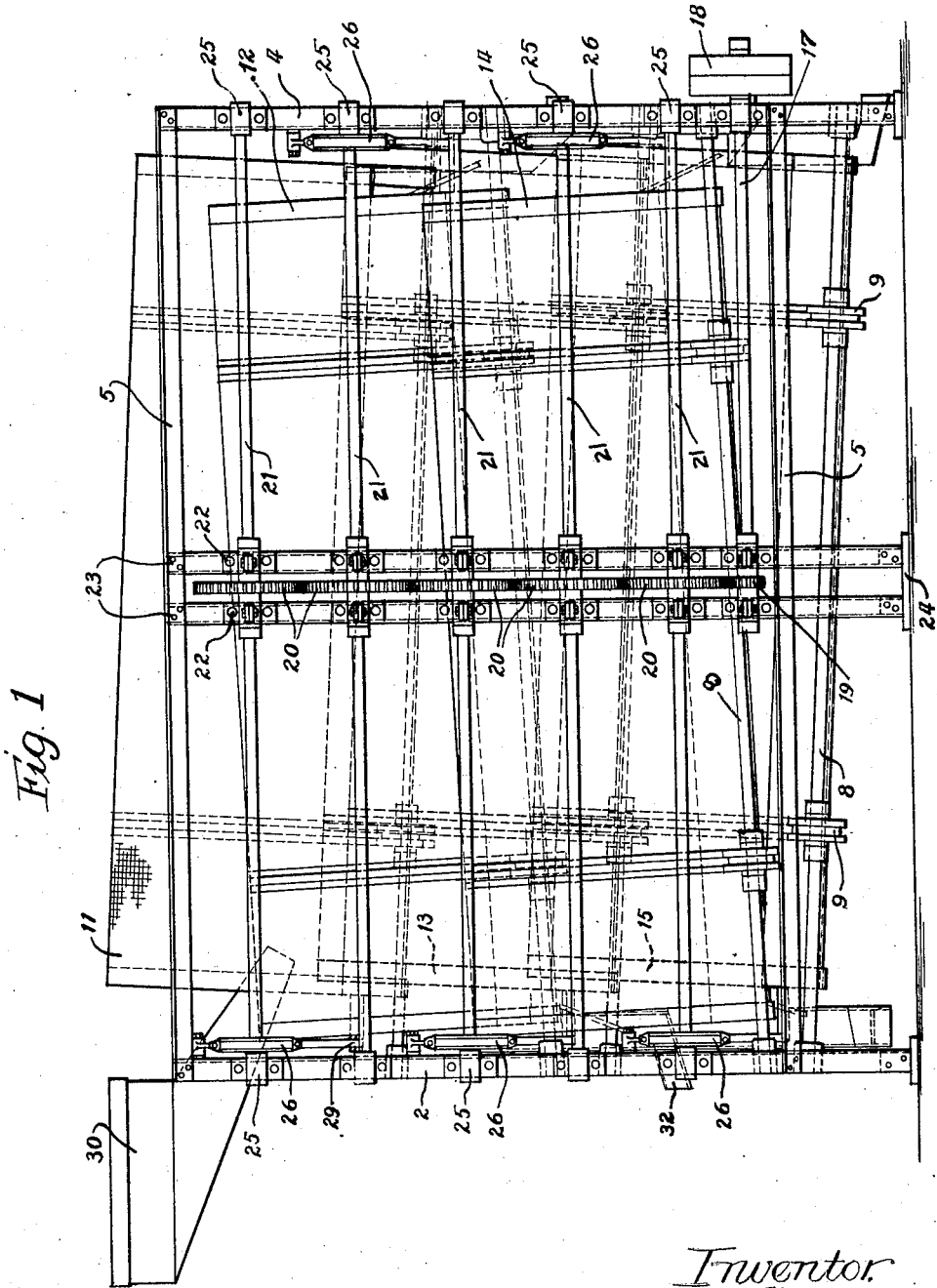
Fig. 1 is a side elevational view of a machine embodying my invention.
Figure 2:
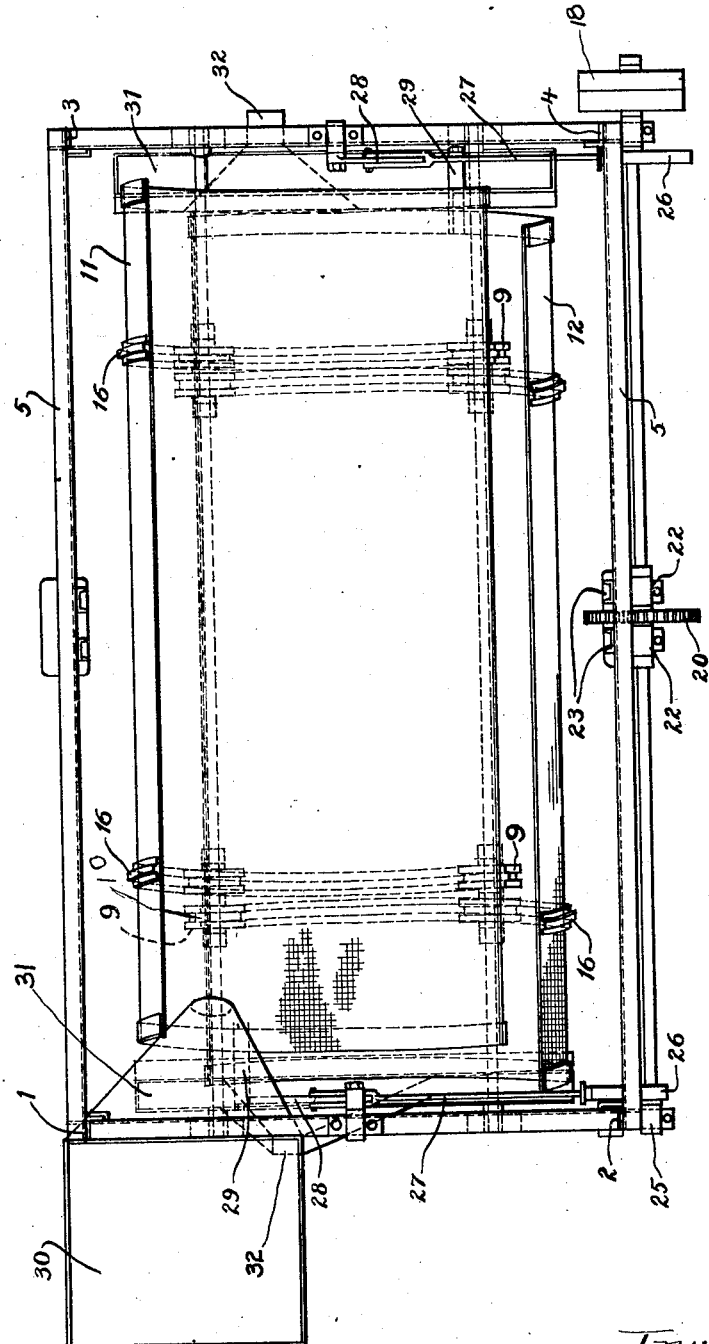
Fig. 2 is a plan view of the machine shown in Fig. 1.

In order to efficiently separate a large quantity of peas into various grades, it has heretofore been necessary to employ machines which occupy a comparatively large amount of space. This space consumption was occasioned by the fact that, in order to provide for the separation of the various grades of peas and the subsequent collecting of these grades, it was necessary to provide comparatively long screen members, and to so position the latter that the peas could be separated and subsequently gathered without the various grades becoming confused. Moreover, in order to satisfactorily separate the peas a comparatively large secren surface was needed for each grade and, consequently this factor also contributed to an unwieldy and large size machine.

One object of my invention is, therefore, to provide a machine of the character designated which shall embody screens of optimum shape and arrangement to permit of the employment of the maximum number thereof in the least volume. I attain this object by employing screens or sieves having a segmental cylindrical shape and by so arranging said sieves that they nest within one another, whereby a minimum volume is consumed.

Again, in the machines of the prior art it has been usual to so arrange the screens that the entire mass of peas is fed to the uppermost screen, the latter having a mesh of such size that only the smallest grade of peas pass therethrough. This grade is received upon a collecting surface and in some convenient manner withdrawn therefrom. All of the peas remaining upon the first screen are, after the elimination of the smaller size peas, deposited upon the next screen which has a mesh of such size that the peas having a size slightly greater than the smallest size pass therethrough. These are received upon a collecting surface and gathered as above indicated.

It is obvious, therefore, that with a machine as described, all of the peas are passed from one screen to another towards the last screen, or in other words, of the entire mass only progressively smaller grades are eliminated. This results in a large amount of handling of all of the peas. Moreover, as I will hereinafter point out in a detailed description of my machine, the use of individual collecting surfaces for each screen or grade of pea results in a machine of substantially twice the size of my machine.

Another object of my invention, therefore, is to so arrange the various screens and to so grade the mesh sizes thereof that the largest grade of material is collected on the first screen while all of the other grades of said material pass through and are eliminated screen-by-screen as they come into contact with a mesh which is too small to allow the grade to be eliminated at that point to pass therethrough. My machine embodies a series of sieves having progressively decreasing mesh sizes.

Again, I so arrange or incline the sieves in my improved machine that alternate sizes of peas gravitate to opposite ends whereby the necessity for greatly extending the screens in a longitudinal direction is eliminated and the machine made very compact.

Incidental objects, as well as the manner in which the above indicated primary objects are accomplished, will be apparent from the consideration of the hereinafter detailed description of my machine.

Referring now to the drawing, my machine comprises a frame built up of angle-iron uprights 1, 2, 3, and 4, longitudinally extending side-angles 5—5, and transversely extending end-angles 6—6 and 7—7, the latter serving to tie the side members together and form a unitary frame.

Extending between the end-angles 6 and 7 are a plurality of supporting rods 8—8, it being noted that the angles 6 and 7 are arranged in ladder-like manner at the ends of the frame, and that they are staggered with respect to each other, whereby the longitudinal extending supporting rods 8—8 are inclined in alternate opposite directions, there being two of said rods in each inclined horizontal plane whereby a cradle is formed in each of said inclined planes. On each of said rods are loosely mounted two rollers 9—9, having formed therein annular channels 10.

Segmental cylindrical screens or sieves 11, 12, 13, 14 and 15, each having ribs 16 formed on the outer surface thereof, are adapted to be cradled on two co-planer rods 8 and to be rocked thereupon by the engagement of the ribs 16 in the channels 10 of the rollers 9. It will be noted that the screens 11, 13 and 15 are inclined in one direction and the screens 12 and 14 in the other direction.

A main shaft 17 is driven by a pulley 18 and carries thereon a gear 19, the latter intermeshing with, and driving, a plurality of intermeshing gears 20—20. The latter are keyed to, and thereby drive, a plurality of shafts 21 which are journaled in clamping lugs 22—22 secured to uprights 23—23, which extend between a bottom plate 24 and the side beam 5. The shafts 21 are also journaled in lugs 25—25 secured to the uprights 2 and 4.

Figure 3:
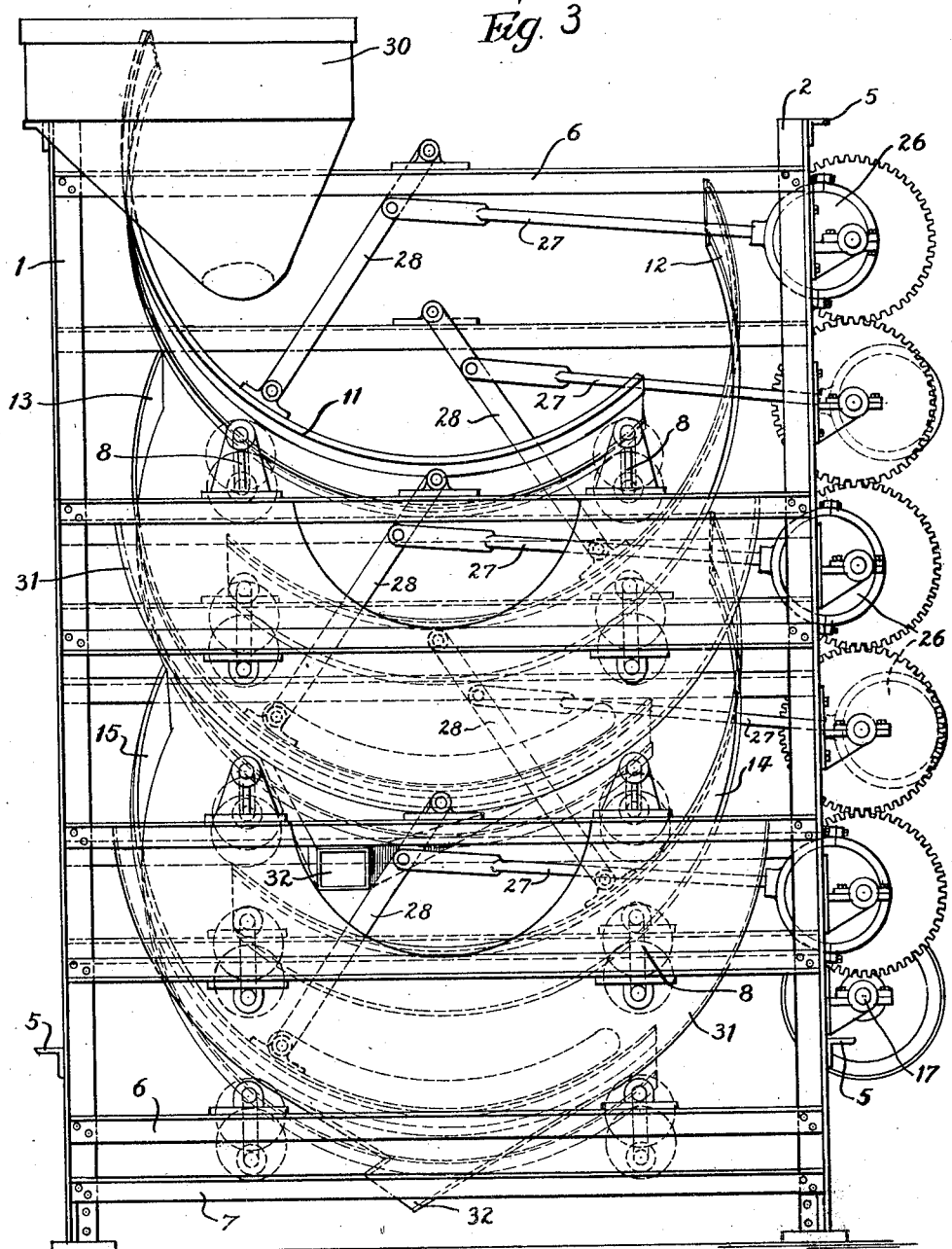
Figs. 3 and 4 are left and right end elevational views, respectively, of the machine shown in Fig. 1.
Figure 4:
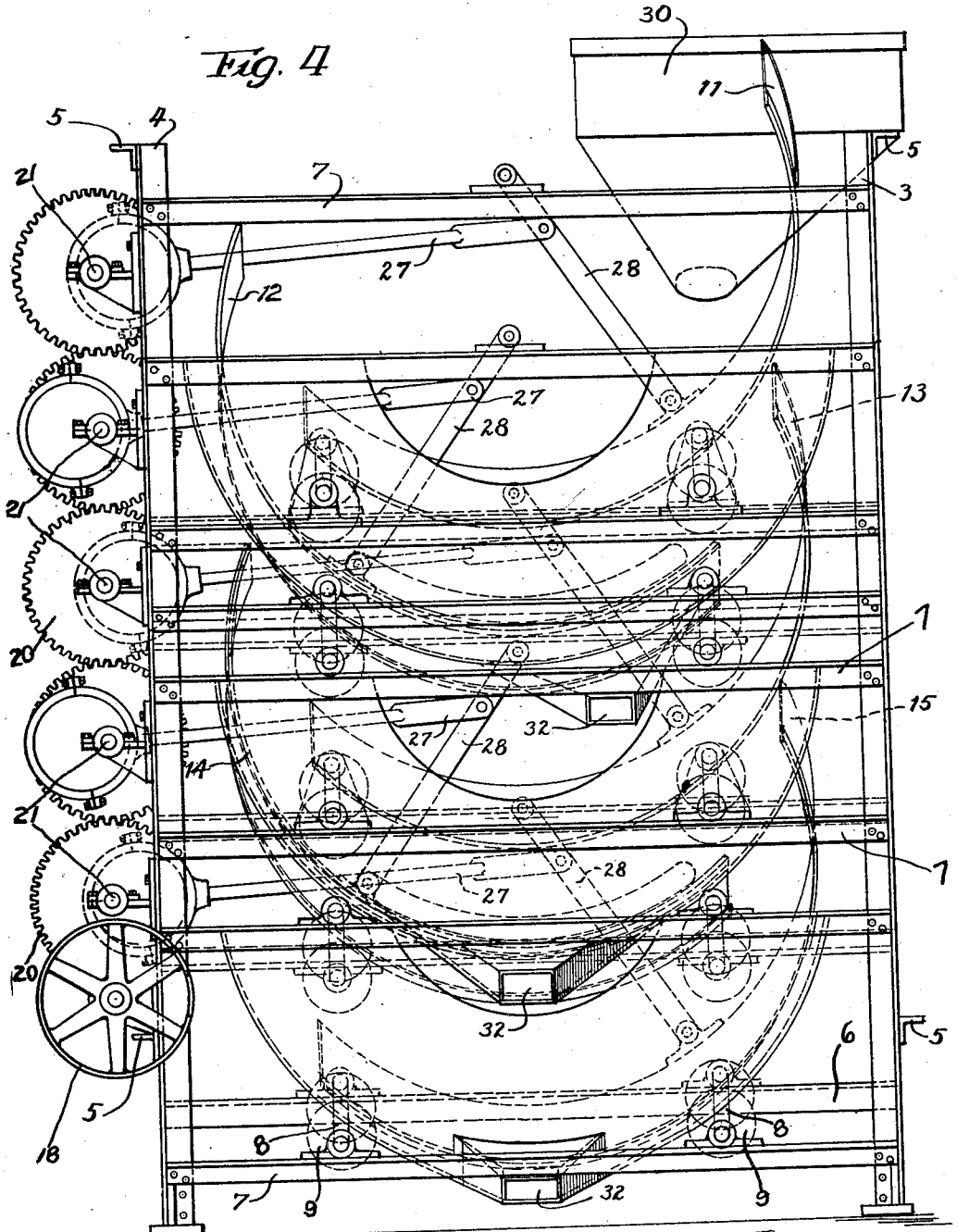
Figure 5:
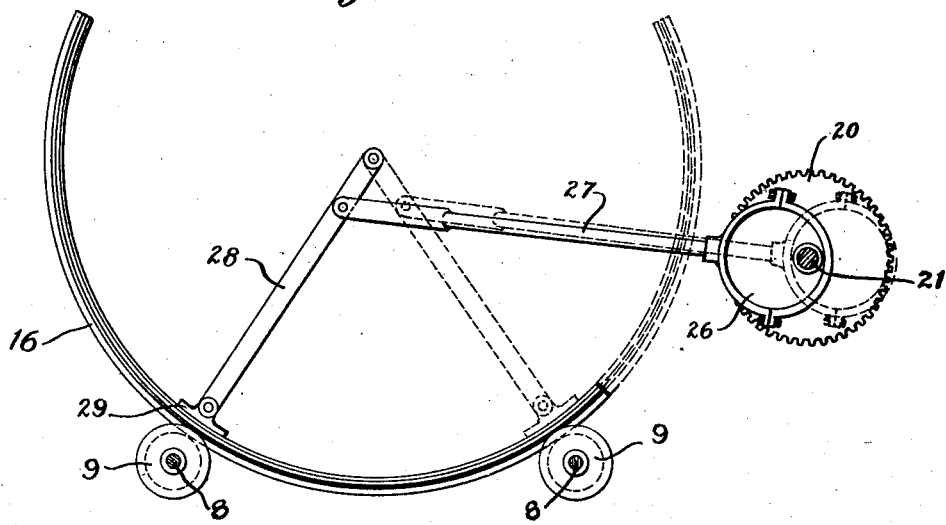
Figs. 5 and 6 are fragmentary views of the screen portion of the machine.
Figure 6:
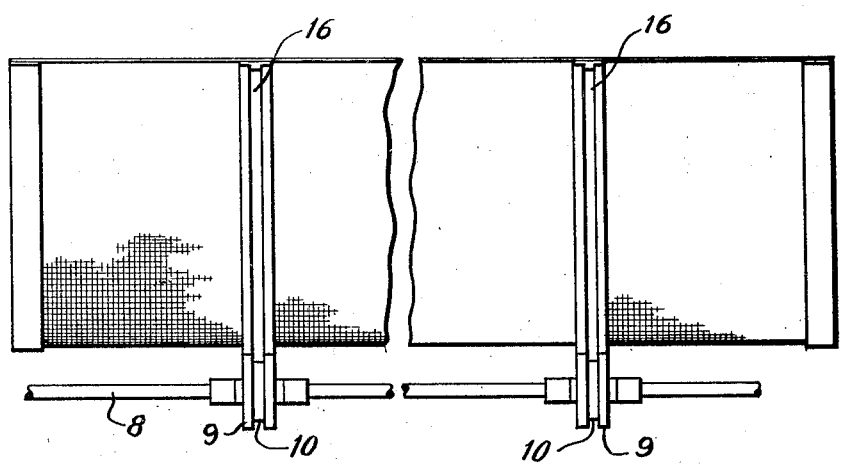

Eccentrics 26—26 are mounted upon the shafts 21 and through connecting rods 27, pivoted rock-shafts 28 and substantially horizontally extending arms 29 secured to the sieves 11 to 15 and to the rock-shafts 28, serve to oscillate the segmental sieves about an axis which is substantially parallel to the generatrices of the surfaces of said sieves. It will be noted that the eccentrics whereby the sieves 11, 13 and 15, inclined in one direction, are oscillated, are positioned at one end of the frame whereas the eccentrics driving the screens 12 and 14, inclined oppositely to the other screens, are located at the other end of the frame, thus promoting, to a large degree, the compactness of the arrangement. Moreover, it will be noted from an inspection of Figs. 3 and 4 that the eccentrics are so set that alternately inclined and therefore adjacent screens are oscillated relatively to each other.

The hopper 30 is adapted to receive the material to be graded. At the lower ends of the inclined screens are positioned collecting hoppers 31 provided at their lower portions with spouts 32 whereby the grade of peas which gravitate to the lower ends of the associated sieves are received and thereafter collected. Here again it will be noted that the location of collecting hoppers for alternate grades at opposite ends of the machine contributes to a large degree in making the machines quite compact.

As I hereinafter describe and claim, the $\frac{1}{n}$ largest sizes are collected at one end of the machine and the $\frac{1}{2n}$ sizes at the other end of said machine, $n$ being an odd number. That is, the peas of the order of 1, 3, 5, 7, etc., are collected at one end of the machine while those of the order 2, 4, 6, 8, etc., are collected at the other end thereof. By this method of grading the possibility of confusion is greatly reduced, since the difference between sizes 1 and 3 is quite marked. In other words, the adjacent hoppers at each end always receive peas at least two sizes apart.

Having now described my machine the advantages which are shown therein will be appreciated by those skilled in the art. The employment of segmental cylindrical sieves allows the same screening surfaces to be positioned in a very much smaller space than if plane screen surfaces were utilized. Again, the particular shape of my screens admits of a number of them being so nested that they may be very compactly arranged.

The operation of my machine is as follows:

The entire amount of peas are fed into the hopper 30 and are deposited therefrom upon the uppermost screen 11 which is shown in Fig. 1 is inclined downwardly to the right. As before indicated, the mesh of this uppermost screen is of such size that only the largest size peas are prevented from passing therethrough. All of the peas with the exception of the largest size, therefore, fall through the meshes and onto the next screen 12 which, it will be observed, is inclined downwardly to the left.

By rotation of the main shaft 17 all of the driven shafts 21 are rotated and therefore the eccentrics serve to oscillate the sieves attached thereto. This oscillatory motion causes the peas, which are held upon the various screens, to slowly gravitate to the lower end thereof whereupon they fall into the proper hoppers 31 and may be drawn off through the spouts 32. Those peas which fall upon the screen 12, all pass therethrough with the exception of the next largest grade which gravitates downwardly toward the left and is drawn off into the hopper associated with the screen 12. In this connection it will be noted that by eliminating the largest size pea first and by arranging the sieves in oppositely inclined and nested relation, as heretofore described, I have eliminated the need for a collecting surface extending throughout the longitudinal dimension of the screen thereby admitting of a more compact arrangement.

Moreover, I have reduced to a minimum the traveling distance of each grade of peas. This last follows because it is no longer necessary for the entire amount to gravitate over each screen until the various sizes are graded, inasmuch as the peas now descend straight through the meshes of the various sieves until a sieve is reached wherein the mesh is of such size that a predetermined grade is held thereupon and thereafter urged by gravity to the lower end of said screen. It is obvious that this system is not as destructive to the peas as the former system wherein the smaller sizes were graded first, all of the remaining grades being handled over the entire surface of the screens in order to eliminate each size.

In my machine the smallest peas descend to the bottom screen at once since they can pass through all meshes but those of said bottom screen. The next smallest grade passes straight through all the screens to the next-to-bottom one, and so on. In other words, each grade of peas is compelled to gravitate along but one screen, namely, that screen the mesh of which is too small to allow the passage of said grade therethrough.

While I have described but one embodiment of my invention it is obvious that many modifications may be made therein whereby the method of separating peas, as heretofore indicated, by eliminating the largest size peas first, may occur to those skilled in the art. I desire, therefore, that the present invention be given the full scope of equivalents and be limited only by the showing of the prior art and by the scope of the appended claims.

Having thus described my invention what I claim as new and desire to secure by Letters Patent is:

1. A grading machine comprising nested and oppositely inclined segmental sieves, and means for rocking said sieves transversely and relatively to each other.

2. A grading machine comprising nested and oppositely inclined segmental sieves, and means for rocking adjacent sieves transversely and relatively to each other.

3. A grading machine, comprising nested and oppositely inclined segmental sieves, and means for reciprocating adjacent sieves relatively to each other and about axes substantially parallel to their surface generatrices.

4. A grading machine comprising nested and alternately oppositely inclined segmental sieves, and means for reciprocating adjacent sieves relatively to each other and about axes substantially parallel to their surface generatrices.

5. A grading machine comprising nested and alternately oppositely inclined segmental cylindrical sieves, and means for reciprocating adjacent sieves relatively to each other and about axes substantially parallel to their surface generatrices.

6. A grading machine comprising a plurality of nested segmental cylindrical and relatively rocking sieves, said sieves having a progressively decreasing mesh.

7. A grading machine comprising a plurality of nested segmental, cylindrical and relatively rocking sieves, said sieves being slightly inclined and the mesh size of said sieves decreasing progressively downwardly.

8. A grading machine comprising a plurality of nested segmental cylindrical sieves, alternate sieves being similarly inclined but adjacent sieves being oppositely inclined, the mesh of said sieves being arranged to grade the material supplied thereto in progressively decreasing sizes.

9. A grading machine comprising a plurality of nested segmental cylindrical sieves, said sieves being slightly inclined, with alternate sieves having the same direction of inclination and the mesh size of said sieves decreasing progressively downwardly, and means for reciprocating adjacent sieves relatively to each other and about axes substantially parallel to their surface generatrices.

10. In a grading machine, a frame, a plurality of nested segmental sieves, adjacent sieves being oppositely inclined, but alternate sieves being similarly inclined, stationary cradle members formed within said frame for supporting said sieves, and means for rocking said sieves.

11. In a grading machine, a frame, a plurality of nested segmental sieves, adjacent sieves being oppositely inclined, but alternate sieves being similarly inclined, supporting members for said sieves comprising bearing portions having channels, a rib on said sieves engaging said bearing channels, and means for rocking said sieves while said rib remains in rolling engagement with said bearing channel.

12. In a grading machine, a frame, a plurality of nested segmental sieves, adjacent sieves being oppositely inclined, but alternate sieves being similarly inclined, having annularly extending segmental ribs thereupon, longitudinal supporting members having rollers mounted thereupon on which said sieves are cradled, and means for rocking said sieves, the ribs on the latter being in rolling contact with said rollers during the rocking.

13. In a grading machine, a frame, a plurality of nested segmental sieves, having annularly extending segmental ribs thereupon, longitudinal supporting members having channeled rollers mounted thereupon on which said sieves are cradled, and means for rocking said sieves, the ribs on the latter being in rolling contact with said roller channels during the rocking.

14. In a grading machine, a frame, a plurality of nested sieves supported in said frame, a main driving shaft, a plurality of driven shafts actuated therefrom, and means connecting some of said sieves to one of said driven shafts whereby said sieves may be transversely oscillated.

15. In a grading machine, frame, a plurality of nested sieves, means for supporting said sieves for rocking movement in said frame, a main driving shaft, a plurality of driven shafts actuated therefrom, and means connecting each of said sieves to one of said driven shafts whereby adjacent sieves may be rocked relatively to each other.

16. In a grading machine, a frame, a plurality of nested segmental cylindrical sieves supported in said frame, a main driving shaft, a plurality of driven shafts disposed in the same vertical plane as said driving shaft and driven therefrom through gears, and means for transmitting the continuous rotary motion of each of said driven shafts to a companion sieve whereby the latter are transversely oscillated.

17. In a grading machine, a frame, a plurality of alternately disposed and anticlinal sieves supported in said frame, a main driving shaft, a plurality of driven shafts disposed in the same vertical plane as said driving shaft and driven therefrom through gears to cause alternate driven shafts to rotate in the same direction, and means for transmitting the continuous rotary motion of each of said driven shafts to a companion sieve whereby alternately disposed and isoclinal sieves are oscillated in the same direction.

18. In a grading machine, a frame, a plurality of alternately disposed and anticlinal sieves supported in said frame, a main driving shaft, a plurality of driven shafts disposed in the same vertical plane as said driving shaft and driven therefrom through gears to cause alternate driven shafts to rotate in the same direction, and means comprising an eccentric mounted on each shaft and a rod extending therefrom to a companion sieve for transmitting the continuous rotary motion of each of said driven shafts to a companion sieve whereby alternately disposed and isoclinal sieves are oscillated in the same direction.

19. In a grading machine, a plurality of nested and oppositely inclined sieves nested one above the other, means for supplying the material to the upper sieve, and hopper means at the extreme lower end of each sieve to gather the material graded thereby.

20. In a grading machine, a plurality of nested and oppositely inclined sieves, means for supplying the material to the upper sieve, and hopper means partially enveloping the lower end of said inclined sieves and cooperating with its associated sieve to gather the material graded thereby.

21. In a grading machine, a frame, a plurality of oppositely inclined nested sieves, means for supporting said sieves for rocking movement by said frame, a plurality of driven shafts also supported by said frame, and each of said sieves being connected to one of said shafts, means imparting a transverse rocking motion thereto, said means for those sieves of one inclination being positioned at one end of the frame and those for the sieves of another inclination being positioned at the other end of the frames.

22. The method of grading a mass of material which comprises separating said mass into a plurality of graded sizes, and collecting the $\frac{1}{n}$ largest sizes in one vicinity and adjacent each other and the $\frac{1}{2n}$ largest sizes at another point and adjacent each other, $n$ being an odd number.

23. The method of grading a mass of material which comprises separating said mass into a plurality of graded sizes, and collecting the $\frac{1}{n}$ largest sizes adjacent each other in one vicinity and the $\frac{1}{2n}$ largest sizes in another vicinity and adjacent each other, $n$ being an odd number, the $\frac{1}{n}$ largest sizes being moved in one direction and the $\frac{1}{2n}$ largest sizes being moved in another direction during said operation.

24. The method of grading a mass of material which comprises separating said mass into a plurality of graded sizes, and collecting the $\frac{1}{n}$ largest sizes adjacent each other and the $\frac{1}{2n}$ largest sizes at another point and adjacent each other, $n$ being an odd number causing the $\frac{1}{n}$ largest sizes to move in one direction and the $\frac{1}{2n}$ largest sizes to move in another direction, and collecting the former sized portions of the mass in one vicinity but in individual lots according to size and the latter sized portions in another vicinity but likewise in individual lots according to size.

25. The method of grading a material aggregate which comprises separating said aggregate into a plurality of graded sizes, the largest size first being separated from the mass and then progressively separating the next largest size, whereby the smallest size is last segregated, and collecting the $\frac{1}{n}$ largest sizes in one vicinity but in separated lots of the same size and the $\frac{1}{2n}$ largest sizes in another vicinity but likewise according to the individual sizes, the $\frac{1}{n}$ sizes being moved in one direction during said separation and the $\frac{1}{2n}$ sizes being moved in the opposite direction at that time, whereby the probability of accidental mixture of immediately adjacent sizes is substantially eliminated.

In witness whereof, I have hereunto subscribed my name.

GEORGE GLASS.